United States Patent

Inaga

[11] 4,249,311
[45] Feb. 10, 1981

[54] GRASS CUTTING APPARATUS

[75] Inventor: Hisashi Inaga, Tokyo, Japan

[73] Assignee: Kioritz Corporation, Japan

[21] Appl. No.: 33,622

[22] Filed: Apr. 26, 1979

[30] Foreign Application Priority Data

Feb. 17, 1979 [JP] Japan .............................. 54-18434[U]

[51] Int. Cl.$^3$ ............................................. A01D 50/00
[52] U.S. Cl. ....................................... 30/276; 56/12.7
[58] Field of Search .................... 30/276, 347; 56/295, 56/12.7

[56] References Cited

U.S. PATENT DOCUMENTS

| 3,664,102 | 5/1972 | Reber | 56/295 |
| 4,024,635 | 5/1977 | Mizuno | 30/276 |
| 4,169,311 | 10/1979 | Evenson | 30/276 |

Primary Examiner—Jimmy C. Peters
Attorney, Agent, or Firm—Karl W. Flocks

[57] ABSTRACT

A grass cutting apparatus including a belt-shaped cutter of the rectangular shape in cross section having a small thickness and pointed edges at its opposed short sides, the belt-shaped cutter being formed of a macromolecular compound and wound on a reel loosely fitted on a hub of a rotary casing.

1 Claim, 5 Drawing Figures

GRASS CUTTING APPARATUS

BACKGROUND OF THE INVENTION

This invention relates to grass cutting apparatus, and more particularly to a grass cutting apparatus provided with a belt-shaped cutter formed of a macromolecular compound.

Heretofore, grass cutting apparatus provided with a cord-type cutter which is circular in cross section, thin, elongated and formed of a macromolecular compound, such as nylon, have been popular and widely used. A cord-type cutter formed of nylon has proved to have disadvantages in that, since nylon is a copolymer, the cord tends to split axially into fiber-like components to form a bunch of separate small strands, so that the cutter becomes blunt and breaks soon after it is put to use. Thus the cord-type cutter is low in durability and not economical.

However, a cord-type cutter has the advantages of being light in weight, safe to use and useful from the practical point of view. Thus this type of cutter has been used widely in recent years in glass cutting apparatus required to be safe in operation.

SUMMARY OF THE INVENTION

This invention has as its object the provision of a grass cutting apparatus provided with a belt-shaped cutter representing an improvement in the cutter of the cord-type of the prior art.

The grass cutting apparatus according to the present invention includes the aforesaid belt-shaped cutter which is higher in durability and sharpness than the cord-type cutter of the prior art, the belt-shaped cutter being wound on a reel in a rotary casing, with a result that the grass cutting apparatus is easy to use and high in performance.

DESCRIPTION OF THE PREFERRED EMBODIMENT

Figure 1:
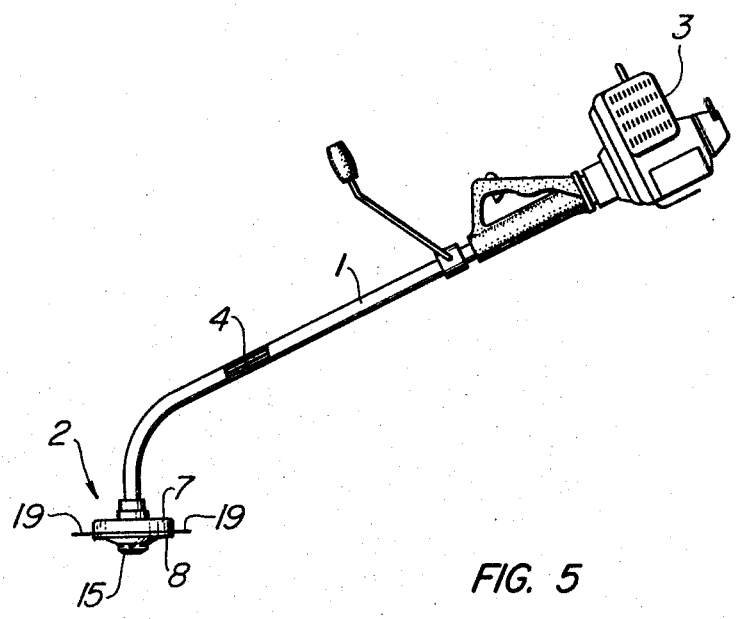
FIG. 1 is a side view of the grass cutting apparatus comprising one embodiment of the present invention.

In FIG. 1, there is shown the grass cutting apparatus comprising one embodiment of the invention, wherein an elongated tubular element 1 having a transmission shaft 4 inserted therein has an engine 3 attached to its upper end and a cutter device 2 mounted at its lower end. Rotation of the engine 3 is transmitted through the transmission shaft 4 to a rotary casing 5 of the cutter device 2 to rotate the casing 5.

The rotary casing 5 is composed of an upper member 7 and a lower member 8 and has a vertical center shaft 6 connected to the transmission shaft 4 for rotation as a unitary structure.

The upper member 7 has a hub having loosely fitted thereon a reel 10 for winding thereon a belt-shaped cutter 9 in roll form. The belt-shaped cutter 9 is wound on the reel 10 in the form of a roll of convolutions.

Figure 2:
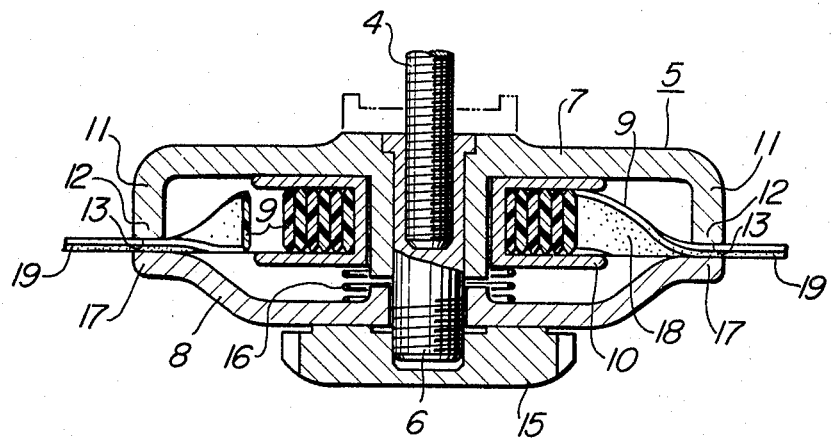
FIG. 2 is a sectional view of the cutter device.
Figure 3:
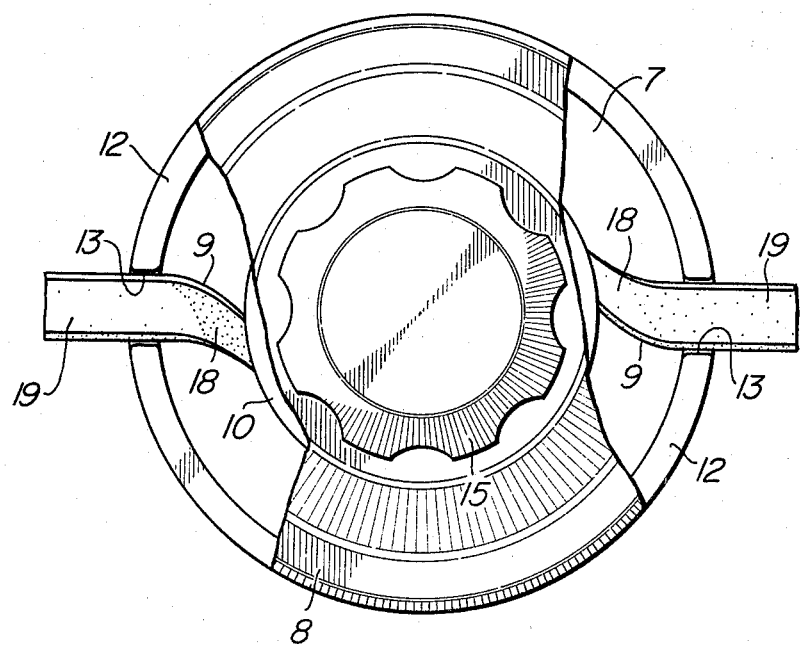
FIG. 3 is a bottom plan view of the cutter device shown in FIG. 2, with certain parts being cut away.

The upper member 7 is formed, as shown in FIG. 2, at a lower edge 12 of a peripheral wall 11 with at least one supply port 13 of a rectangular shape disposed horizontally. Preferably, there are provided a plurality of supply ports 13 for balancing the rotary casing 5.

The belt-shaped cutter 9 is rectangular in cross section and has a small thickness. The belt-shaped cutter 9 of the rectangular shape is formed at its opposed short sides with pointed edges 14. Being formed of a macromolecular compound (such as urethane rubber), the belt-shaped cutter 9 is highly flexible and tough.

Figure 4:
FIG. 4 is a sectional view of the belt-shaped cutter.

The belt-shaped cutter 9 shown in cross section in FIG. 4 is paid out of the roll on the reel 10 and led through the supply port 13 out of the casing 5 to provide a servicing cutter portion 19. The lower member 8 is fitted coaxially to the upper member 7 and fastened thereto by nut 15.

The reel 10 is urged upwardly by the biasing force of a spring 16 into pressing contact with the upper member 7 so as to be fixed in place in the casing 5. The belt-shaped cutter 9 is pressed against a peripheral edge 17 of the lower member 8 or the vicinity thereof to be held in place with its long sides being disposed horizontally.

The belt-shaped cutter 9 is twisted through 90 degrees at 18 between the reel 10 and the supply port 13.

Thus the servicing cutter portion 19 of the belt-shaped cutter 9 extends outwardly of the rotary casing 5 in a horizontal position to form a grass cutting plane when the rotary casing 5 rotates.

In the embodiment shown and described herein, the reel 10 is loosely fitted on the hub of the rotary casing 5 and can be freely rotated.

In operation, the lower member 8 is fastened to the upper member 7 to permit the belt-shaped cutter 9 to be held in place at the supply port 13. Rotation of the rotary casing 5 swings the servicing cutter portion 19 to thereby cut grass. When the servicing cutter portion 19 is worn and it is desired to replace the worn cutter portion by a fresh cutter portion 19, the screw 15 is loosened to permit the movement of the belt-shaped cutter 9 pressed against the upper member 7 when the screw 15 is tightened, so that a required length of servicing cutter portion 19 can be paid out of the reel 10. In this case, the reel 10 freely rotates and enables the belt-shaped cutter 9 to be paid out.

The servicing cutter portion 19 disposed outside the casing 5 performs a grass cutting operation when the cutter portion 19 strikes grass. During this operation, the servicing cutter portion 19 would be subjected to distortion. The distortion could be overcome by the flexibility of the material. However, it is necessary to provide means for absorbing shock and preventing excess deformation of the servicing cutter portion 19 when the latter strikes some hard objects.

Figure 5:
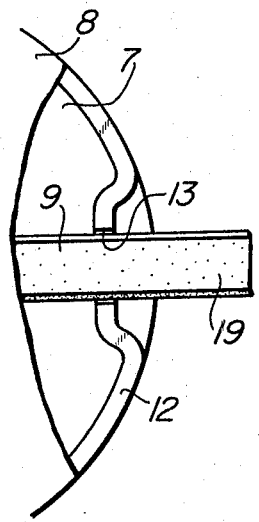
FIG. 5 is a fragmentary bottom plan view of the cutter device showing a modification of means for fixing the belt-shaped cutter.

To this end, the belt-shaped cutter 9 may be fixed in place in a position which is slightly inward of the position described previously, as shown in FIG. 5. At the same time, the supply port 13 may be provided with a clearance, at either side thereof, of a size large enough to prevent deformation of the servicing cutter portion 19, in an effort to avoid breakage of the belt-shaped cutter 9. According to the present invention, such latitude of design is covered by the scope of the invention.

The servicing cutter portion 19 has increased sharpness because the leading edge of the cutter portion 19 has a pointed edge, in spite of the material for the cutter portion 19 being a macromolecular compound. Thus the belt-shaped cutter 9 according to the present invention cuts grass sharper than a cord-type cutter of a circular cross section of the prior art.

Also, the belt-shaped cutter 9 according to the present invention can develop strong shearing power for cutting grass, because it is wide horizontally.

When urethane rubber is used as a material for forming the belt-shaped cutter 9 according to the present invention, the flexibility of the material is combined with the aforesaid means for fixing the belt-shaped cutter 9 in place at the periphery of the rotary casing 5 to achieve synergetic effects in reducing the shock of collision against hard objects, reducing scattering of broken pieces, avoiding danger to the user and increasing durability of the cutter.

What is claimed is:

1. A grass cutting apparatus comprising:
   (a) a rotary casing having a hub portion and including an upper member and a lower member;
   (b) a rotary shaft extending in and through said upper and lower members;
   (c) a reel loosely fitted around said hub of said casing;
   (d) a belt-shaped cutter formed of a macromolecular compound wound around said reel, said belt-shaped cutter having a rectangular shape of small thickness in cross section and pointed edges at opposed short sides thereof; and
   (e) means pressing said upper and lower members together toward each other and securing said upper and lower members on said shaft so as to be operative to rotate with said shaft as a unit;
   wherein one of said upper and lower members of said casing includes a peripheral wall forming at least one supply port with an adjacent edge of the other of said upper and lower members through which said belt-shaped cutter extends outwardly from said rotary casing when paid out of said reel with its long sides disposed horizontally to move in a grass cutting plane as a servicing portion swung by rotation of said rotary casing, said means pressing said upper and lower members together toward each other also being effective to press said belt-shaped cutter between said upper and lower members thereby holding said belt-shaped cutter in place in said supply port, and said reel is effective to wind up said belt-shaped cutter when desired.

* * * * *